(12) United States Patent
Wang et al.

(10) Patent No.: US 10,847,477 B2
(45) Date of Patent: Nov. 24, 2020

(54) DEVICE HAVING PHYSICALLY UNCLONABLE FUNCTION, METHOD FOR MANUFACTURING SAME, AND CHIP USING SAME

(71) Applicants: Semiconductor Manufacturing International (Shanghai) Corporation, Shanghai (CN); Semiconductor Manufacturing International (Beijing) Corporation, Beijing (CN)

(72) Inventors: Dong Wang, Shanghai (CN); Xiao Yan Bao, Shanghai (CN); Tian Hua Dong, Shanghai (CN); Guang Ning Li, Shanghai (CN)

(73) Assignees: Semiconductor Manufacturing (Shanghai) International Corporation, Shanghai (CN); Semiconductor Manufacturing (Beijing) International Corporation, Beijing (CN)

( * ) Notice: Subject to any disclaimer, the term of this patent is extended or adjusted under 35 U.S.C. 154(b) by 0 days.

(21) Appl. No.: 15/980,141

(22) Filed: May 15, 2018

(65) Prior Publication Data
US 2019/0074256 A1   Mar. 7, 2019

(30) Foreign Application Priority Data

Sep. 1, 2017  (CN) .......................... 2017 1 0778298

(51) Int. Cl.
*H01L 23/00* (2006.01)
*H01L 21/3215* (2006.01)
(Continued)

(52) U.S. Cl.
CPC ............ *H01L 23/576* (2013.01); *G06F 21/72* (2013.01); *H01L 21/2257* (2013.01);
(Continued)

(58) Field of Classification Search
CPC .......... H01L 29/0847; H01L 29/66606; H01L 29/66719; H01L 29/66553;
(Continued)

(56) References Cited

U.S. PATENT DOCUMENTS

2004/0061175 A1* 4/2004 Fukuda ............. H01L 29/41733
257/347
2007/0141795 A1* 6/2007 Park .................... H01L 29/4983
438/294

(Continued)

*Primary Examiner* — Natalia A Gondarenko
(74) *Attorney, Agent, or Firm* — Brinks Gilson & Lione

(57) ABSTRACT

The present application relates to a technical field of semiconductors, and discloses a device having a physically unclonable function, a method for manufacturing same, and a chip using same. The may method include: providing a substrate structure that comprises: a substrate comprising encryption device areas and reference device areas; at least one first gate structure on the encryption device areas and used in an encryption device and a first spacer layer on a side wall of the first gate structure; a first interconnection layer on the encryption device areas and the first spacer layer; at least one second gate structure on the reference device areas and used in a reference device and a second spacer layer on a side wall of the second gate structure; and a second interconnection layer on the reference device area and the second spacer layer; performing first ion injection, so as to introduce first impurities into the first interconnection layer; performing second ion injection, so as to introduce second impurities into the first and second interconnection layers, where a password of the device having a physically unclonable function is determined according to a drain current of each encryption device and a drain current of a reference device corresponding to the encryption device.

10 Claims, 3 Drawing Sheets

(51) Int. Cl.
*H01L 21/8234* (2006.01)
*H01L 21/225* (2006.01)
*H01L 29/08* (2006.01)
*H01L 29/66* (2006.01)
*H01L 29/36* (2006.01)
*H01L 29/45* (2006.01)
*G06F 21/72* (2013.01)
*H04L 9/32* (2006.01)
*H04L 9/08* (2006.01)
*H01L 29/417* (2006.01)
*H01L 27/088* (2006.01)

(52) U.S. Cl.
CPC ............... *H01L 21/32155* (2013.01); *H01L 21/823418* (2013.01); *H01L 21/823475* (2013.01); *H01L 27/088* (2013.01); *H01L 29/0847* (2013.01); *H01L 29/36* (2013.01); *H01L 29/41725* (2013.01); *H01L 29/456* (2013.01); *H01L 29/6656* (2013.01); *H01L 29/66575* (2013.01); *H04L 9/0866* (2013.01); *H04L 9/3278* (2013.01); *G06F 2221/2107* (2013.01)

(58) Field of Classification Search
CPC ......... H01L 29/66515; H01L 29/66575; H01L 29/6656; H01L 29/66568; H01L 29/41725; H01L 29/36; H01L 29/437; H01L 29/456; H01L 21/28132; H01L 21/28141; H01L 21/2815; H01L 21/28273; H01L 21/82347; H01L 21/823418; H01L 21/823468; H01L 21/823864; H01L 21/823871; H01L 21/2257; H01L 21/32155; H01L 21/76823; H01L 21/76825; H01L 21/76828; H01L 21/7685; H01L 21/76859; H01L 27/088; H01L 23/576; H04L 9/3271; H04L 9/3278; H04L 9/34; H04L 12/10; G06F 21/71; G06F 21/72; G06F 21/79; G06F 21/82; G06F 21/88
USPC .................................. 257/300, 382, 639
See application file for complete search history.

(56) References Cited

U.S. PATENT DOCUMENTS

| 2010/0081246 | A1* | 4/2010 | Shin ..................... H01L 21/265 438/303 |
| 2016/0365850 | A1* | 12/2016 | Hurwitz ............. H01L 27/1203 |
| 2017/0295027 | A1* | 10/2017 | Kim ..................... H04L 9/0866 |
| 2018/0277496 | A1* | 9/2018 | Lisart ................... H01L 27/088 |

* cited by examiner

DEVICE HAVING PHYSICALLY UNCLONABLE FUNCTION, METHOD FOR MANUFACTURING SAME, AND CHIP USING SAME

RELATED APPLICATIONS

The present application claims priority to Chinese Patent Appln. No. 201710778298.2, filed Sep. 1, 2017, the entire disclosure of which is hereby incorporated by reference.

BACKGROUND

Technical Field

The present application relates to a technical field of semiconductors, and in particular, to a device having a physically unclonable function, a method for manufacturing same, and a chip using same.

Related Art

Physically unclonable technology, like a unique human body feature (for example, a fingerprint or iris), is a new method used for guaranteeing security of chip data files and preventing information data from being stolen. By using an inherent and specific physical feature and property of each semiconductor device as an encryption key, the semiconductor device cannot be replicated, thereby effectively protecting user's data files.

Properties of instability and induplication of a device at a critical state in a processing process are usually utilized in a physically unclonable technical chip, randomness and differences generated thereby may be used in generation of a password and security authentication.

At present, most physically unclonable functions are implemented by using a special process in manufacturing of chips. However, to implement the physically unclonable functions, other properties of the chips may be affected, and the process may become quite complicated if other functions of the chips are not affected.

SUMMARY

An objective of the present disclosure lies in: implementing a device having a physically unclonable function while not influencing other properties of the device as much as possible.

A first aspect of the present disclosure provides a method for manufacturing a device having a physically unclonable function. The method may include: providing a substrate structure, the substrate structure including a substrate, including encryption device areas and reference device areas; at least one first gate structure on the encryption device areas and configured for use in an encryption device; a first spacer layer on a side wall of the first gate structure; a first interconnection layer on the encryption device areas and the first spacer layer; at least one second gate structure on the reference device areas and configured for use in a reference device; a second spacer layer on a side wall of the second gate structure; and a second interconnection layer on the reference device area and the second spacer layer; performing a first ion injection, the first ion injection including introducing first impurities into the first interconnection layer; and performing a second ion injection, the second ion injection including introducing second impurities into the first interconnection layer and the second interconnection layer, where the second impurities in the first interconnection layer are diffused to the encryption device areas at two sides of the first gate structure, to form a first source area and a first drain area used in the encryption device; the second impurities in the second interconnection layer are diffused to the reference device areas at two sides of the second gate structure, to form a second source area and a second drain area used in the reference device, where a password of the device having a physically unclonable function is determined according to a drain current of each encryption device and a drain current of a reference device corresponding to the encryption device.

In some implementations, the password of the device having a physically unclonable function is determined according to a difference between the drain current of each encryption device and the drain current of the reference device corresponding to the encryption device.

In some implementations, the first ion injection further includes introducing first impurities into the first gate of the first gate structure.

In some implementations, the first impurities include a Group IV element.

In some implementations, the first impurities include one or more selected from a group consisting of: Ge, Si, and C.

In some implementations, the injected dose of the first ion injection is in a range of $1 \times 10^{12}/cm^2$ to $1 \times 10^{16}/cm^2$.

In some implementations, the injected energy of the first ion injection is in a range of 3 KeV to 100 KeV.

In some implementations, a top of the first spacer layer is higher than a top of the first gate of the first gate structure; and a top of the second spacer layer is higher than a top of the second gate of the second gate structure.

In some implementations, materials of the first interconnection layer and the second interconnection layer include polysilicon.

In some implementations, one encryption device corresponds to one reference device.

In some implementations, a plurality of encryption devices corresponds to one reference device.

In another aspect, the present disclosure provides a device having a physically unclonable function, including: a substrate, including encryption device areas and reference device areas; an encryption device array, including at least one encryption device, where each encryption device includes: a first gate structure on the encryption device area; a first spacer layer on a side wall of the first gate structure; a first interconnection layer on the encryption device area and the first spacer layer; and a first source area and a first drain area in the encryption device areas at two sides of the first gate structure; and a reference device array, including at least one reference device, where each reference device includes: a second gate structure on the reference device area; a second spacer layer on a side wall of the second gate structure; a second interconnection layer on the reference device area and the second spacer layer; and a second source area and a second drain area in the reference device areas at two sides of the second gate structure, where the first interconnection layer includes first impurities introduced through first ion injection, where a password of the device having a physically unclonable function is determined according to a drain current of each encryption device and a drain current of a reference device corresponding to the encryption device.

In some implementations, the password of the device having a physically unclonable function is determined according to a difference between the drain current of each encryption device and the drain current of the reference device corresponding to the encryption device.

In some implementations, the first gate of the first gate structure includes the first impurities introduced through first ion injection.

In some implementations, the first impurities include a Group IV element.

In some implementations, the first impurities include one or more selected from a group consisting of: Ge, Si, and C.

In some implementations, a top of the first spacer layer is higher than a top of the first gate of the first gate structure; and a top of the second spacer layer is higher than a top of the second gate of the second gate structure.

In some implementations, materials of the first interconnection layer and the second interconnection layer comprise polysilicon.

In some implementations, one encryption device corresponds to one reference device.

In some implementations, a plurality of encryption devices corresponds to one reference device.

In another aspect, the present disclosure provides a chip, including a device having a physically unclonable function according to any one of disclosed embodiments or implementations.

The manufacturing methods provided in the embodiments and implementations of the present disclosure have the following beneficial effects:

In one aspect, a process of ion injection is additionally performed in the encryption device areas after forming the first interconnection layer and the second interconnection layer, to enable the formed first source area and first drain area to have randomness, so that there is a difference between the drain currents of the encryption device and the reference device. Such a difference enables the device to have a physically unclonable function, so that information data inside the device can be effectively protected.

In another aspect, there is strict randomness in determining a password according to a drain current of each encryption device and a drain current of a reference device corresponding to the encryption device.

Still in another aspect, the manufacturing method according to the embodiments of the present application is compatible with a normal process for manufacturing a device, and substantially does not influence other properties of the device.

Other features, aspects, and advantages of the present application may become clear in the detailed description of the exemplary embodiments of the present application below with reference to the accompanying drawings.

BRIEF DESCRIPTION OF THE DRAWINGS

The accompanying drawings that constitute a part of the specification describe the exemplary embodiments and implementations of the present disclosure, and together with the specification, are used to interpret the principles of the present disclosure, where in the accompanying drawings.

DETAILED DESCRIPTION

Exemplary embodiments and implementations of the present disclosure are described below in detail with reference to the accompanying drawings. It should be understood that, unless otherwise specified, the relative arrangement, numeral expressions, and values of the parts and steps described in the embodiments and implementations should not be understood as limitations to the scope of the present disclosure.

In addition, it should be understood that for ease of description, the sizes of the parts shown in the accompanying drawings do not need to be drawn according to actual proportion relationships, for example, the thickness or width of some layers may be exaggerated relative to other layers.

The description of the following exemplary embodiments and implementations are for illustration only and should not be used as a limitation to the disclosure or use of the present disclosure in any sense.

Technologies, methods, and devices that are well known by a person skilled in the art may not be discussed in detail. However, the technologies, methods, and devices should be regarded as a part of the present disclosure where the technologies, methods, and devices are applicable.

It should be noted that similar numerals and letters represent similar items in the accompanying drawings below. Therefore, once an item is defined or described in an accompanying drawing, the item is not further discussed in the description of the subsequent accompanying drawings.

Figure 1:
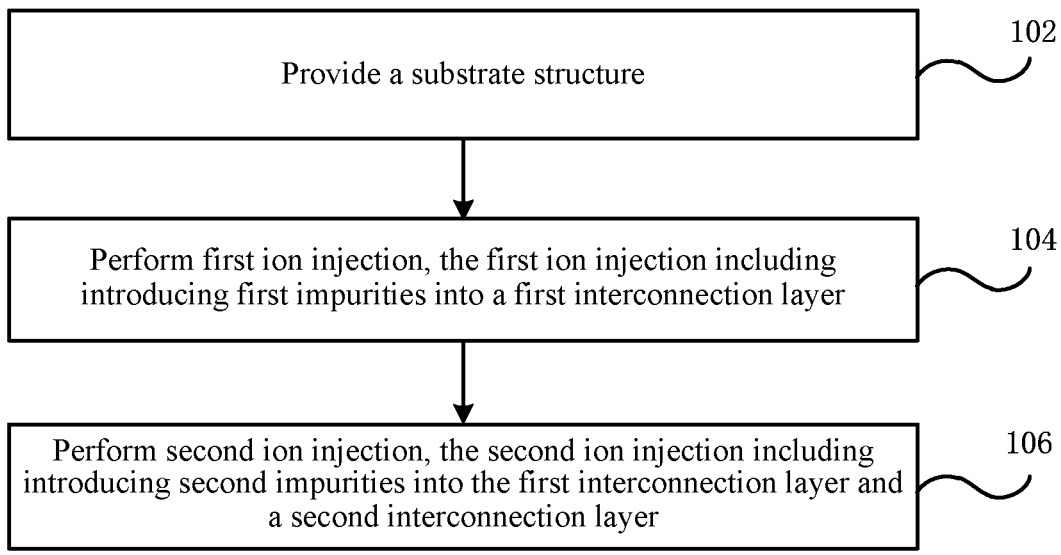
FIG. 1 is a simplified flow chart of a method for manufacturing a device having a physically unclonable function.
Figure 2A:
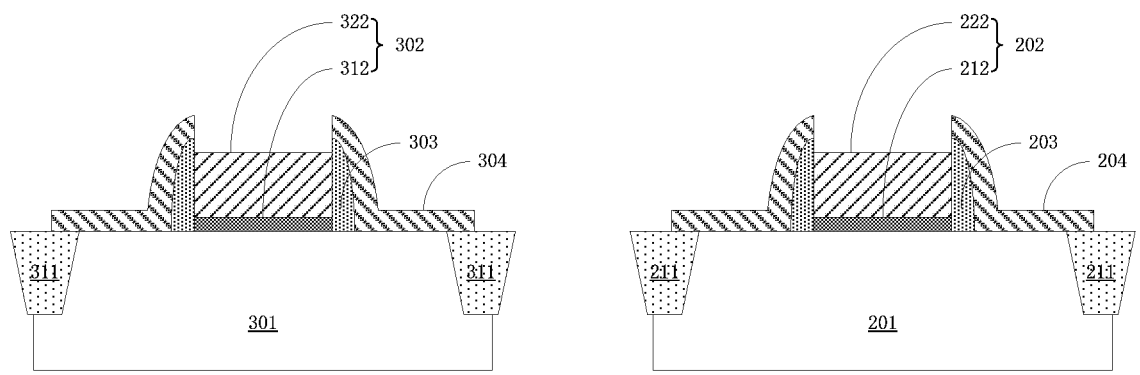
FIG. 2A to FIG. 2C are schematic diagrams of stages of a method for manufacturing a device having a physically unclonable function.
Figure 2B:
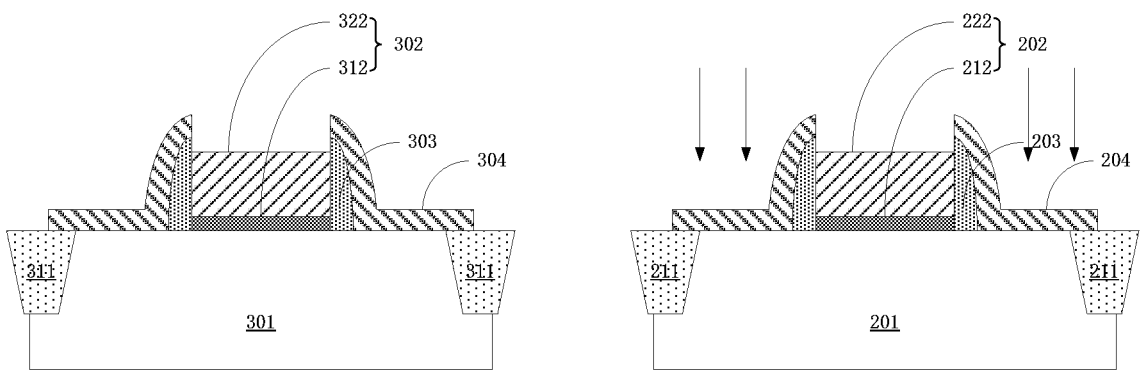
Figure 2C:
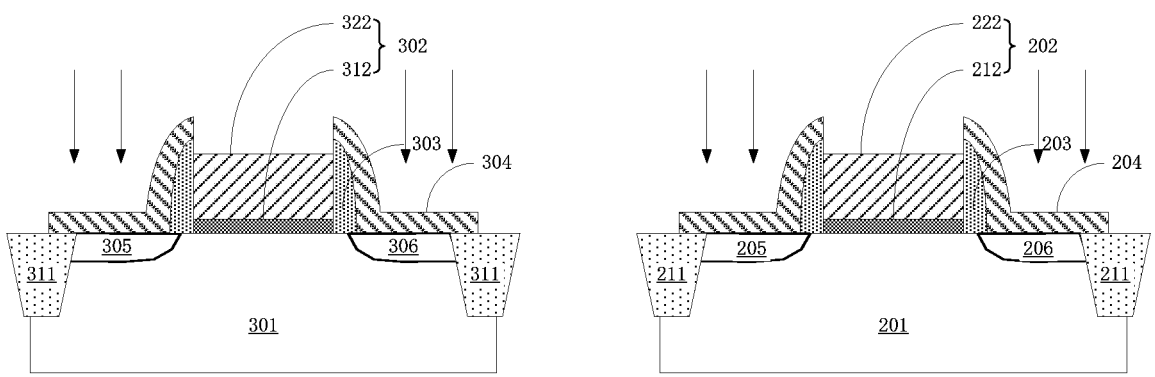

FIG. 1 is a simplified flow chart of a method for manufacturing a device having a physically unclonable function. FIG. 2A to FIG. 2C are schematic diagrams of stages of this method for manufacturing a device having a physically unclonable function.

As shown in FIG. 1, first, in step 102, a substrate structure is provided.

FIG. 2A is a schematic diagram of one form of a substrate structure. As shown in FIG. 2A, the substrate structure may include a substrate. The substrate includes encryption device areas 201 and reference device areas 301. The substrate, for example, may be an element semiconductor substrate such as a silicon substrate and a germanium substrate, or may be a compound semiconductor substrate such as a gallium arsenide substrate. An isolation structure 211 may be formed in the encryption device area 201, and an isolation structure 311 may be formed in the reference device area 301. The isolation structure 211 and the isolation structure 311 may be, for example, a Shallow Trench Isolation (STI) structure.

The substrate structure may also include one or a plurality of first gate structures 202 on the encryption device areas 201 and used in an encryption device. For brief description, FIG. 2A shows only one first gate structure 202. In some implementations, the first gate structure 202 may include a first gate dielectric layer 212 (for example, silicon oxides) and a first gate 222 (for example, polysilicon) on the first gate dielectric layer 212. It should be understood that the structure of the first gate structure 202 is not limited herein. In other implementations, the first gate structure 202 may include a hard layer on the first gate 222, for example.

The substrate structure may also include a first spacer layer 203 on a side wall of the first gate structure 202 and a first interconnection layer 204 on the encryption device areas 201 and the first spacer layer 203. Here, the first interconnection layer 204 may also be partially formed on the isolation structure 211. The first interconnection layer 204 may be used for forming a contact on the isolation structure 211, so that the contact does not need to be formed on a first source area and a first drain area that are subsequently formed. In this way, the sizes of the first source area and the first drain area are reduced, and thus the size of the device is reduced. In some implementations, the material of the first interconnection layer 204 may include polysilicon or the like. Preferably, a top of the first spacer layer 203 is higher than a top of the first gate 222 of the first gate structure 202, so that the first interconnection layer 204 and the first gate 222 are guaranteed not to contact, thereby avoiding a short circuit.

The substrate structure may also include one or a plurality of second gate structures 302 on the reference device areas 301 and used in a reference device. For brief description, FIG. 2A shows only one second gate structure 302. In some implementations, the second gate structure 302 may include a second gate dielectric layer 312 (for example, silicon oxides) and a second gate 322 (for example, polysilicon) on the second gate dielectric layer 212. It should be understood that the structure of the second gate structure 202 is not limited herein. In other implementations, the second gate structure 202 may include a hard layer on the second gate 322, for example.

The substrate structure may also include a second spacer layer 303 on a side wall of the second gate structure 302 and a second interconnection layer 304 on the reference device areas 301 and the second spacer layer 303. Here, the second interconnection layer 304 may also be partially formed on the isolation structure 311. Likewise, the second interconnection layer 304 may be used for forming a contact on the isolation structure 311, so that the contact does not need to be formed on a second source area and a second drain area that are subsequently formed. In this way, the sizes of the second source area and the second drain area are reduced, and thus the size of the device is reduced. In some implementations, the material of the second interconnection layer 204 may include polysilicon or the like. Preferably, a top of the second spacer layer 303 is higher than a top of the second gate 322 of the second gate structure 302, so that the second interconnection layer 304 and the second gate 322 are guaranteed not to contact, thereby avoiding a short circuit.

In some implementations, the substrate structure may be formed by means of the following method.

First, an initial substrate structure is provided. The initial substrate structure may include a substrate. The substrate may include encryption device areas 201 and reference device areas 301. The initial substrate structure may also include an initial first gate structure formed on the encryption device areas 201 and an initial second gate structure formed on the reference device areas 301. The initial first gate structure may include a first gate dielectric layer 212 formed on the encryption device areas 201, a first gate 222 on the first gate dielectric layer 212, and a first hard mask layer on the first gate 222. The initial second gate structure may include a second gate dielectric layer 312 formed on the reference device areas 301, a second gate 322 on the second gate dielectric layer 312, and a second hard mask layer on the second gate 322. Exemplarily, the first hard mask layer and the second hard mask layer may be silicon nitrides, silicon oxides, silicon oxides of nitrogen, or the like.

Subsequently, an interconnection material layer, for example, a polysilicon layer, is formed on the initial substrate structure.

Then, the interconnection material layer is patterned, to expose the first mask layer and the second mask layer with the remaining interconnection material layer to be used as the first interconnection layer 204 and the second interconnection layer 304, as shown in FIG. 2A.

Subsequently, the first mask layer and the second mask layer are removed, to expose the first gate 222 and the second gate 322, so as to form the substrate structure shown in FIG. 2A.

Referring again to FIG. 1, in step 104, first ion injection is performed, as shown in FIG. 2B. Here, the first ion injection may include introducing first impurities into the first interconnection layer 204. When performing first ion injection, ion bombardment may change dimensions of crystal particles in the first interconnection layer 204, and the change of the dimensions of crystal particles is random.

In some implementations, the first ion injection further includes introducing first impurities into the first gate 222 of the first gate structure 202. That is, the first ion injection may be performed on the whole encryption device area 201 without additionally shielding the first gate 222. Preferably, the first impurities may include a Group IV element. For example, injection of a Group IV element in the first ion injection does not generate a doping effect on the first interconnection layer. Still for example, even if a Group IV element is introduced into the first gate 222, other properties of the device, such as the threshold voltage and saturation current, are not influenced. More preferably, the first impurities may include one or more selected from a group consisting of: Ge, Si, and C. Preferably, the injected dose of the first ion injection is in a range of $1\times10^{12}/cm^2$ to $1\times10^{16}/cm^2$, for example, $1\times1^{13}/cm^2$, $1\times10^{14}/cm^2$, or $1\times10^{15}/cm^2$. Preferably, the injected energy of the first ion injection is in a range of 3 KeV to 100 KeV, for example, 10 KeV, 30 KeV, or 60 KeV. In practical processing, the amount of the injected energy may be adjusted according to different elements injected.

Subsequently, in step 106, second ion injection is performed, as shown in FIG. 2C. The second ion injection includes introducing second impurities into the first interconnection layer 204 and the second interconnection layer 304. Preferably, a thermal annealing process is performed after the second ion injection.

The second impurities in the first interconnection layer 204 may be diffused to the encryption device areas 201 at two sides of the first gate structure 202, so as to form a first source area 205 and a first drain area 206 for use in an encryption device. The second impurities in the second interconnection layer 304 may be diffused to the reference device areas 301 at two sides of the second gate structure 302, so as to form a second source area 305 and a second drain area 306 for use in a reference device. In some implementations, the encryption device and the reference device are NMOS devices and the second impurities may be a Group V element, such as phosphate. In another embodiment, the encryption device and the reference device are PMOS devices and the second impurities may be a Group III element, such as boron.

When performing first ion injection, ion bombardment may change dimensions of crystal particles in the first interconnection layer 204, and the change of the dimensions of crystal particles is random. Therefore, when performing second ion injection, diffusion of the second impurities introduced into the first interconnection layer 204 to the encryption device areas 201 is also random. Thus, the depths of the formed first source area 205 and first drain area 206 are also random. Such the randomness may be permanently fixed on the physical construction of the encryption device. That is, a physically unclonable concept is generated.

The randomness of the first source area 205 and the first drain area 206 may influence the electric leakage performance of the encryption device.

Figure 3:
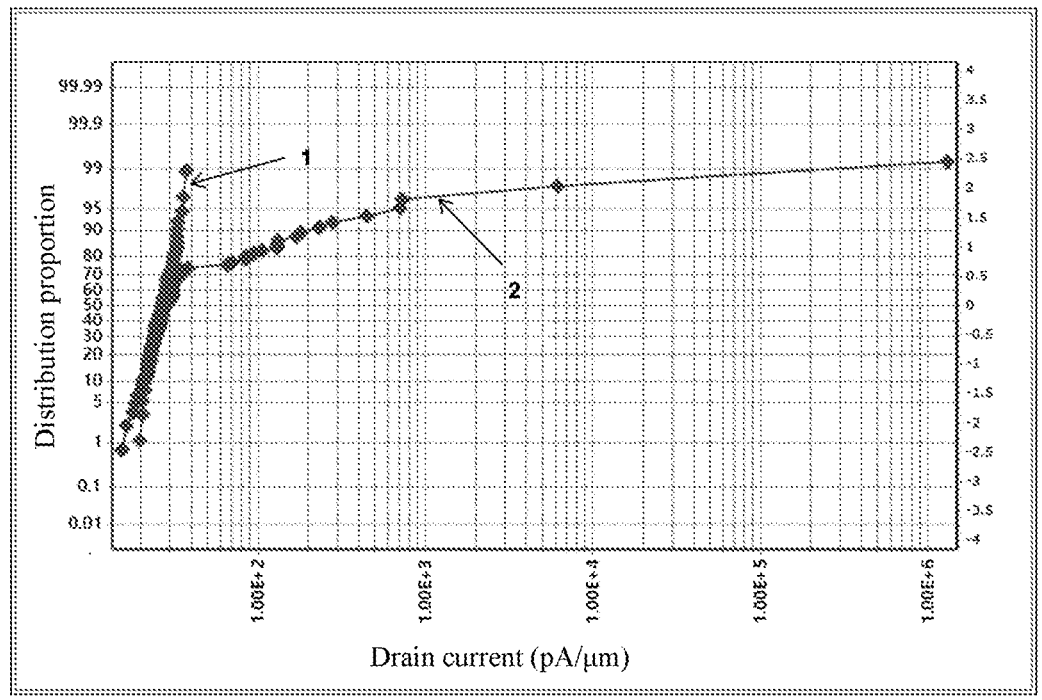
FIG. 3 is a schematic diagram of comparison between drain currents of an encryption device and a reference device.

Therefore, there may be a difference between drain currents of the encryption device and the reference device. FIG. 3 is a schematic diagram of comparison between drain currents of an encryption device and a reference device. In FIG. 3, the curve 1 represents the drain current of the reference device, and the curve 2 represents the drain current of the encryption device. As can be learned from FIG. 3, drain currents of some encryption devices are closed to the drain current of the reference device, and drain currents of some encryption devices differ a lot from the drain current of the reference device.

Therefore, a password of the device having a physically unclonable function can be determined according to a drain current of each encryption device and a drain current of a reference device corresponding to the encryption device. In some implementations, one encryption device corresponds to one reference device. In other implementations, a plurality of encryption devices corresponds to one reference device.

In some implementations, the drain current of the encryption device is a current between the first source area and the first drain area when no voltage is applied to the first gate, and the drain current of the reference device is a current between the second source area and the second drain area when no voltage is applied to the second gate.

Figure 4:
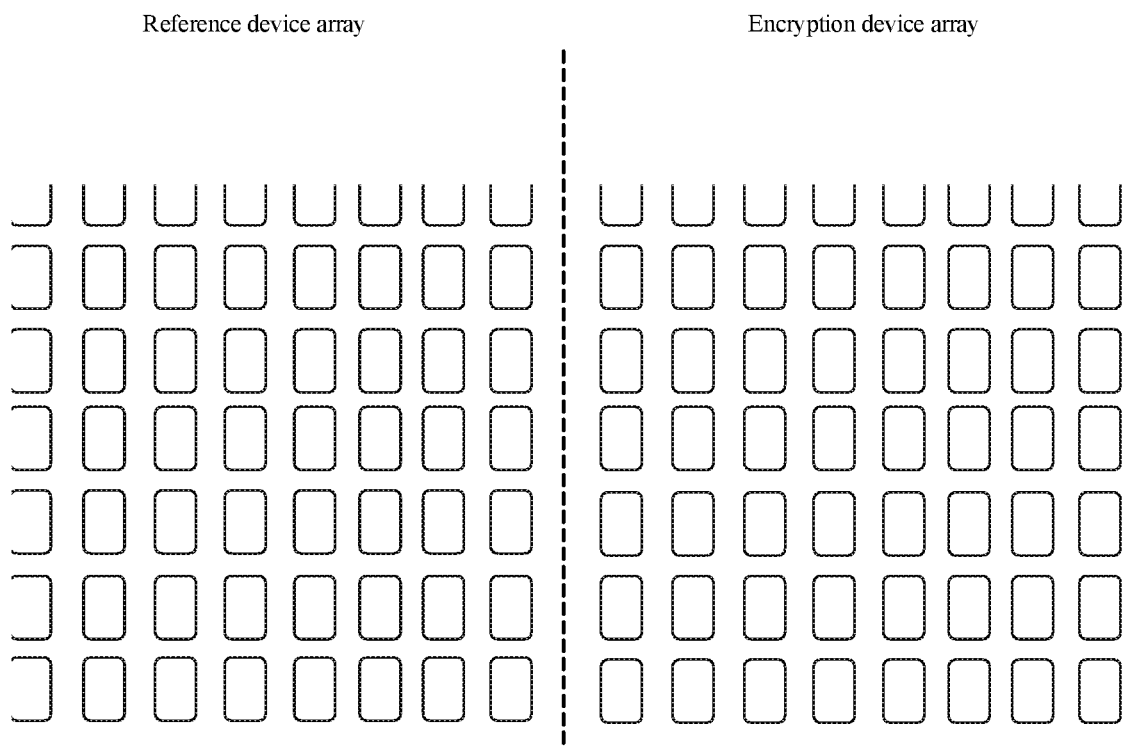
FIG. 4 is a schematic diagram of an instance of an encryption device array and a reference device array.

FIG. 4 is a schematic diagram of an instance of an encryption device array and a reference device array. As shown in FIG. 4, the encryption device array and the reference device array both are 8×8 arrays, and one encryption device corresponds to one reference device. For example, the encryption devices and reference devices may correspond one to one with each other according to an arrangement sequence of the arrays. That is, an encryption device at the $i^{th}$ row and the $j^{th}$ column may correspond to a reference device at the $i^{th}$ row and the $j^{th}$ column, where i and j both are integers in a range of 1 to 8. Still for example, the encryption devices and reference devices may correspond one to one with each other in a random manner. That is, an encryption device at the $i^{th}$ row and the $i^{th}$ column may correspond to a reference device at the $m^{th}$ row and the $n^{th}$ column, where i, j, m, and n are all integers in a range of 1 to 8.

In addition, in some implementations, a plurality of encryption devices may also correspond to one reference device. For example, one row of encryption devices in FIG. 4 correspond to one reference device, or one column of encryption devices correspond to one reference device.

In an implementation, if a difference between a drain current of an encryption device and a drain current of a reference device corresponding to the encryption device is greater than a preset difference, a password corresponding to the encryption device is defined as 1, and otherwise, the password is defined as 0. Random passwords in an 8×8 array may be formed for a reference device in an 8×8 array. Each figure in a random password is either 1 or 0, so that $2^{64}$ passwords are formed.

It should be noted that there may be different standards for defining a figure of a random password as 1 or 0 according to a drain current of each encryption device and a drain current of a reference device corresponding to the encryption device. For example, vice versa, if a difference between a drain current of an encryption device and a drain current of a reference device corresponding to the encryption device is greater than a preset difference, a password corresponding to the encryption device is defined as 0, and otherwise, the password is defined as 1. Still for example, if a drain current of an encryption device and a drain current of a reference device corresponding to the encryption device satisfy a specific rule, for example, an algorithm, a password corresponding to the encryption device is defined as 0, and otherwise, the password is defined as 1.

There are various standards for defining a figure in a random password as 1 or 0, which are not listed herein, and a person skilled in the art may define the figure by using a plurality of standards according to the disclosure of the present application, as long as the password is determined according to a drain current of each encryption device and a drain current of a reference device corresponding to the encryption device, which all fall within the protection scope of the present disclosure.

Forms of the manufacturing method provided in the embodiments and implementations of the present disclosure has the following beneficial effects:

In one aspect, a process of ion injection is additionally performed in the encryption device areas after forming the first interconnection layer and the second interconnection layer, to enable the formed first source area and first drain area to have randomness, so that there is a difference between the drain currents of the encryption device and the reference device. Such a difference enables the device to have a physically unclonable function, so that information data inside the device can be effectively protected.

In another aspect, there is strict randomness in determining a password according to a drain current of each encryption device and a drain current of a reference device corresponding to the encryption device.

In a still further aspect, forms of the manufacturing method according to the embodiments and implementations of the present disclosure are compatible with a normal process for manufacturing a device, and substantially does not influence other properties of the device.

The present application further provides a device having a physically unclonable function.

Referring to FIG. 2C, the device includes a substrate having encryption device areas 201 and reference device areas 301.

The device may further include an encryption device array. The encryption device array may include one or a plurality of encryption devices. Each encryption device includes a first gate structure 202 on the encryption device area 201, a first spacer layer 203 on a side wall of the first gate structure 202, a first interconnection layer 204 (for example, polysilicon) on the encryption device area 201 and the first spacer layer 203, and a first source area 205 and a first drain area 206 in the encryption device areas 201 at two sides of the first gate structure 202. The first interconnection layer 204 includes first impurities introduced through first ion injection. Preferably, a top of the first spacer layer 203 is higher than a top of a first gate 222 of the first gate structure 202.

In some implementations, the first gate 222 of the first gate structure 202 includes the first impurities introduced through first ion injection. Preferably, the first impurities include a Group IV element. More preferably, the first impurities include one or more selected from a group consisting of: Ge, Si, and C.

The device may further include a reference device array. The reference device array may include one or a plurality of reference devices. Each reference device includes a second gate structure 302 on the reference device area 301, a second spacer layer 302 on a side wall of the second gate structure 303, a second interconnection layer 304 (for example, polysilicon) on the reference device area 301 and the second spacer layer 303, and a second source area 305 and a second drain area 306 in the reference device areas 301 at two sides of the second gate structure 302. Preferably, a top of the second spacer layer 303 is higher than a top of a second gate 322 of the second gate structure 302.

A password of the device shown in FIG. 2C may be determined according to a drain current of each encryption device and a drain current of a reference device corresponding to the encryption device. In some implementations, a password of a device may be determined according to a difference between a drain current of each encryption device and a drain current of a reference device corresponding to the encryption device. In some implementations, one encryption device corresponds to one reference device. In other implementations, a plurality of encryption devices corresponds to one reference device.

The present application also provides a chip. The chip may include the device having a physically unclonable function according to any one of the embodiments or implementations. The chip having the device having a physically unclonable function can be anti-copying and tampering.

Above, devices having a physically unclonable function, methods for manufacturing same, and chips using the same according to embodiments and implementations of the present disclosure have been described in detail. To avoid obstructing the concepts of the present disclosure, some well-known details in this field are not described. A person skilled in the art will fully understand how to implement the technical solution disclosed herein according to the above description. In addition, the respective embodiments and implementations taught by the disclosure of the present disclosure can be freely combined. A person skilled in the art will understand that various amendments can be made to the above described embodiments and implementations without departing from the scope and the spirit of the present disclosure.

What is claimed is:

1. A method for manufacturing a device having a physically unclonable function, comprising:
   providing a substrate structure, the substrate structure comprising:
      a substrate comprising encryption device areas and reference device areas;
      a first gate structure positioned on the encryption device areas and configured for use in an encryption device;
      a first spacer layer on a side wall of the first gate structure;
      a first interconnection layer on the encryption device areas and the first spacer layer;
      a second gate structure positioned on the reference device areas and configured for use in a reference device;
      a second spacer layer on a side wall of the second gate structure; and
      a second interconnection layer on the reference device areas and the second spacer layer;
   performing a first ion injection, the first ion injection introducing first impurities comprising a Group IV element into the first interconnection layer only; and
   after performing the first ion injection, performing a second ion injection, the second ion injection comprising introducing second impurities comprising a Group V element into the first interconnection layer and the second interconnection layer,
   wherein the second impurities in the first interconnection layer are diffused to the encryption device areas at two sides of the first gate structure, to form a first source area and a first drain area used in the encryption device;
   the second impurities in the second interconnection layer are diffused to the reference device areas at two sides of the second gate structure, to form a second source area and a second drain area used in the reference device, and
   wherein a password of the device having a physically unclonable function is determined according to a drain current of each encryption device and a drain current of a reference device corresponding to the encryption device.

2. The method according to claim 1, wherein the password of the device having a physically unclonable function is determined according to a difference between the drain current of each encryption device and the drain current of the reference device corresponding to the encryption device.

3. The method according to claim 1, wherein the first ion injection further comprises introducing first impurities into a first gate of the first gate structure.

4. The method according to claim 1, wherein the first impurities comprise one or more impurities selected from a group consisting of: Ge, Si, and C.

5. The method according to claim 1, wherein an injected dose of the first ion injection is in a range of $1\times10^{12}/cm^2$ to $1\times10^{16}/cm^2$.

6. The method according to claim 1, wherein an injected energy of the first ion injection is in a range of 3 KeV to 100 KeV.

7. The method according to claim 1, wherein:
   a top of the first spacer layer is higher than a top of a first gate of the first gate structure; and
   a top of the second spacer layer is higher than a top of a second gate of the second gate structure.

8. The method according to claim 1, wherein:
   materials of the first interconnection layer and the second interconnection layer comprise polysilicon.

9. The method according to claim 1, wherein one encryption device corresponds to one reference device.

10. The method according to claim 1, wherein a plurality of encryption devices corresponds to one reference device.

* * * * *